March 24, 1925.
D. W. SMITH
DOUGH DIVIDER
Filed Oct. 26, 1922
1,530,623
2 Sheets-Sheet 1
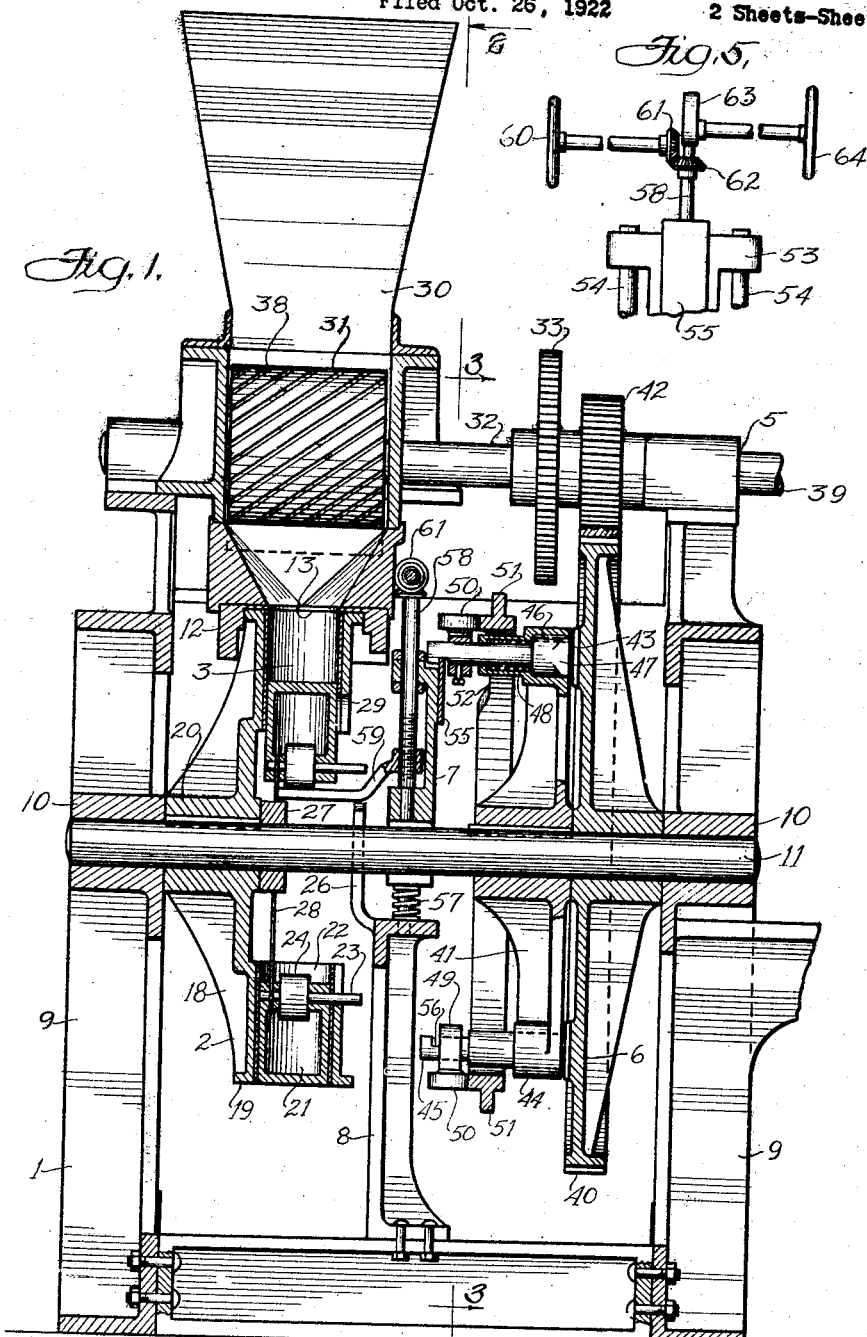

March 24, 1925.
D. W. SMITH
1,530,623
DOUGH DIVIDER
Filed Oct. 26, 1922
2 Sheets-Sheet 2
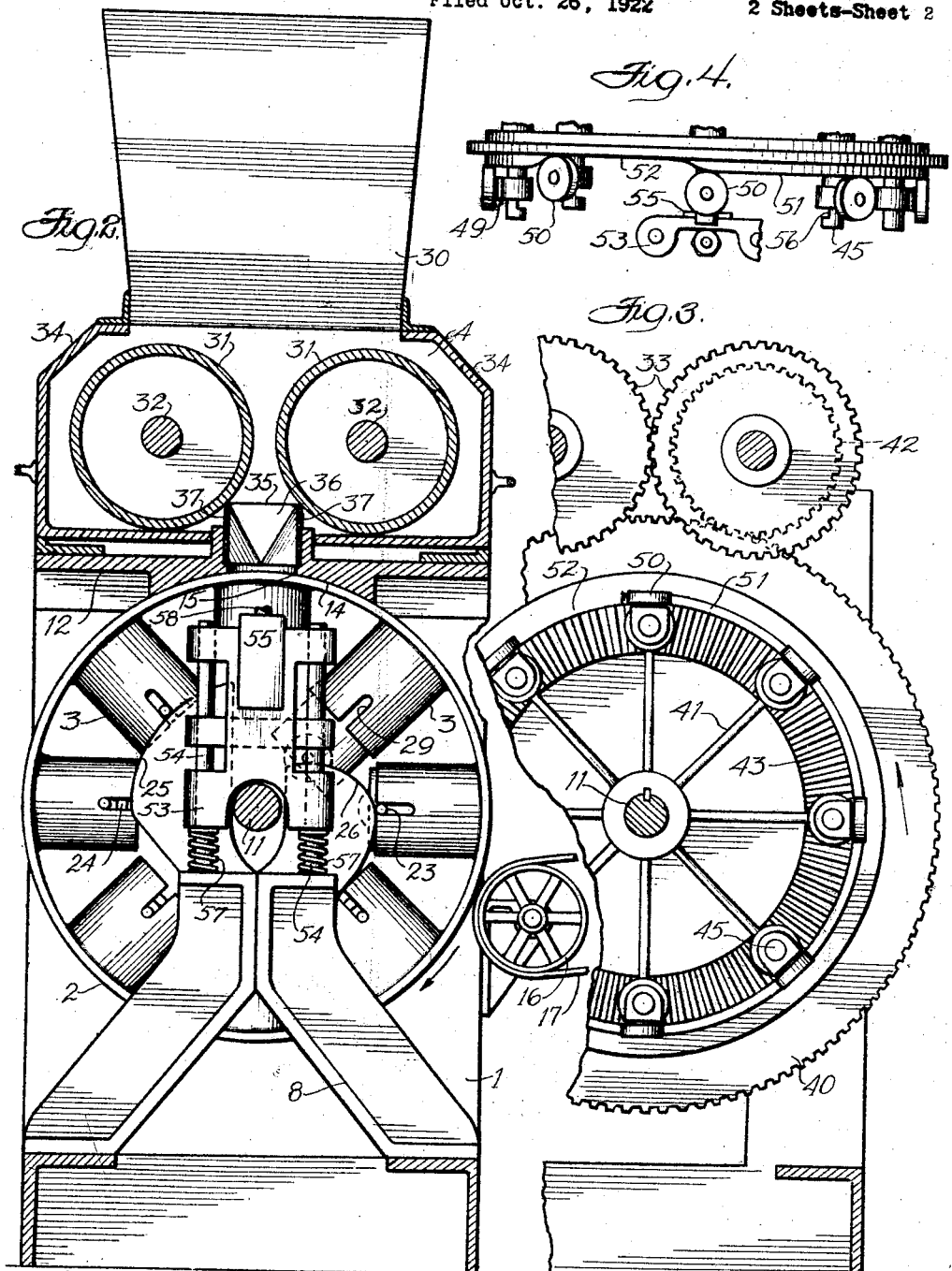

Patented Mar. 24, 1925.

1,530,623

UNITED STATES PATENT OFFICE.

DENNIS WOOD SMITH, OF WILMETTE, ILLINOIS, ASSIGNOR TO COLBORNE MANUFACTURING CO., OF CHICAGO, ILLINOIS, A CORPORATION OF ILLINOIS.

DOUGH DIVIDER.

Application filed October 26, 1922. Serial No. 597,076.

*To all whom it may concern:*

Be it known that I, DENNIS WOOD SMITH, a citizen of the United States of America, and a resident of Wilmette, county of Cook, and State of Illinois, have invented a new and useful Improvement in Dough Dividers, of which the following is a specification.

This invention relates to dough dividers of the type wherein the dough is delivered in charges of predetermined size and weight into cells provided with movable bottoms and supported by a movable carrier, the charges of dough being successively discharged before the respective cells move into position to receive other charges from the delivery mechanism.

The main objects of this invention are to provide an improved construction and arrangement of carrier for dough dividers of the aforesaid type; to provide improved mechanism for intermittently operating the carrier so as to bring the cells successively into filling and discharging positions; to provide improved means for discharging the dough from the cells; and to provide operating mechanism of the above character, which is controlled by the position of the movable bottom in the cell which is arranged to receive dough from the delivery mechanism.

An illustrative embodiment of this invention is shown in the accompanying drawings, wherein—

Figure 1 is a central vertical section, partly in elevation, of a dough divider embodying this invention, and for the sake of clearness, certain parts of the mechanism in the background have been omitted, as not being essential to a clear understanding of the invention.

Figure 2 is a transverse vertical section, taken on the line 2—2 of Figure 1.

Figure 3 is a transverse vertical section, taken on the line 3—3 of Figure 1, and showing the clutch mechanism in elevation.

Figure 4 is a top plan of the cam track which controls the clutch, part of the clutch elements being also shown.

Figure 5 is a detail of part of the tripping mechanism.

In the form shown, the dough divider includes a plurality of cells, having movable bottoms forming scale plates, and being supported by a carrier which is rotatable on a horizontal axis for moving the cells from upright to inverted position. Dough is delivered to the cells in succession by delivery means mounted above the carrier, and the charges of dough are subsequently ejected by the movable bottoms which are cammed outwardly when the cells reach the discharging position. The carrier is connected to operating mechanism by an improved form of clutch which is arranged for intermittent operation for effecting a step by step movement of the cells to facilitate the delivery of the dough. The clutch is controlled by tripping mechanism, which is arranged to coact with the scale plates in succession, so as to be actuated by the movement of the respective scale plate to a predetermined position relative to its cell, when the latter is located in position to receive a charge of dough.

Referring to the drawings, the dough divider comprises a frame 1, on which is rotatably mounted a carrier 2, having a plurality of cells 3, which are successively movable into position to receive charges of dough from delivery means 4 supported on the frame above the carrier. The carrier is intermittently rotated, to effect a step by step movement of the cells, by means of operating mechanism 5, including a clutch 6, which is controlled by tripping mechanism 7.

In the form shown, the frame 1 comprises a central structure 8 for supporting the tripping mechanism 7, and end members 9 having bearings 10, for rotatably supporting a horizontal shaft 11, on which is mounted the carrier 2 and clutch 6. Extending between the end members 9 and located below the delivery means 4, is a stationary top member 12 having a central opening 13, through which the dough is fed to the cells 3. The bottom of the member 12 is provided with a concave face 14, which slidably engages the periphery of the carrier, so as to permit the inner edge 15 of the member 12 to coact with the rims of the cells 3 for severing the charges of dough from the batch when the carrier is rotated. Journaled in the end members 9 at one side of the frame, is a roller 16 for supporting an endless conveyer 17, which is arranged in position to receive the charges of dough when they are ejected from the cells.

As illustrated, the carrier 2 comprises a spider 18, including a peripheral flange 19, and having a hub 20, keyed to the shaft 11. The cells 3 extend radially inwardly from the peripheral flange 19, and are uniformly spaced apart circumferentially, as shown in Figure 2. The cells are tubular in form and are provided with movable bottoms 21, in the form of radially shiftable plungers mounted in bushings 22. The plungers 21 form scale plates which are forced inwardly by the weight of the dough when the cells are located in upright position for filling, and which are cammed outwardly for ejecting the dough when the cells reach the discharge position. Mounted on the inner end of each of the plungers 21, is a shaft 23, on which is journaled a roller 24, arranged in position to coact with the tripping mechanism, as hereinafter described.

The shafts 23 project through the plungers 21 on one side of the carrier to coact with cams 25 and 26, which are mounted on the frame structure 8, on respectively opposite sides of the shaft 11. The cam 25 is arranged to hold the plungers of the upwardly moving cells flush with the peripheral flange 19 until the respective cell reaches the filling position. The cam 25 is interrupted at a point below the outlet 13 of the delivery means, so that when the respective cell reaches an upright position, its plunger is free to move inwardly under the action of the dough. The friction between the scale plates and the bushings 22 prevents the scale plates from falling inwardly when in upright position after being released from the cam 25. The cam 26 is arranged to urge the plungers outwardly, after the respective cells have been filled by the delivery means, for ejecting the charges of dough onto the endless conveyer 17. If desired, the cam 26 may be located in position to coact with the rollers 24 instead of with the shafts 23. Fixed on the shaft 11, is a hub 27, having fingers 28 projecting radially outwardly in sliding engagement with the inner ends of the plungers 21, for securing the movable bottoms against wabbling. Outward movement of the plungers 21 is limited by the projecting parts of the shafts 23, which co-act with recesses 29 formed in the cells 3.

The delivery means 4 includes a hopper 30, supported on the frame 1 above the carrier, and a pair of feed rollers 31, supported on shafts 32, journaled in the frame structure, and connected to the operating mechanism 5 by gears 33 arranged for rotating the rollers 31 in opposite directions so as to feed the dough from the hopper through the outlet 13. The hopper 30 is provided with removable gates 34 on opposite sides of the rollers 31, to permit access to the interior of the hopper for the purpose of cleaning. Arranged below the rollers 31, is a block 35, having a frusto-conical chute 36 registering with the outlet opening 13, and having a pair of scrapers 37 mounted therein in position to coact with the peripheries of the rollers 31. The peripheries of the rollers 31 are spirally grooved, as shown at 38, to provide gripping surfaces for pulling the dough through the hopper.

The operating mechanism 5 includes a shaft 39, adapted to be continuously driven by a motor, (not shown), or other suitable means, and is connected to the carrier by the clutch 6.

In the form shown, the clutch 6 comprises a pair of concentrically arranged coacting members 40 and 41. The member 40 is in the form of a gear loosely mounted on the shaft 11, and meshing with a pinion 42 fixed on the operating shaft 39. Formed on the inner face of the gear 40 is an annular rack 43.

The member 41 is in the form of a spider fixed on the driven shaft 11, and having bearing parts 44 formed at the outer ends of the spider arms. The bearing parts 44 correspond in number to the cells 3, and the spider 41 is arranged so as to locate the bearings 44 in axial alinement with the cells. Supported in the bearings 44, are clutch elements in the form of axially shiftable plungers 45, which are splined to the bearings, as shown at 46. The inner ends of the plungers 45 are formed to provide shoulders 47, which are adapted to coact with the annular rack 43 of the gear 40, for connecting the clutch members. The plungers 45 are normally urged into engagement with the rack 43 by helical springs 48, arranged within the bearing parts 44. Mounted on each of the plungers 45 adjacent the outer end thereof, is a collar 49, carrying a roller 50, which is located in position to coact with an annular cam track 51 for holding the plungers 45 in a retracted position.

The track 51 is fixed on the frame structure in concentric relation to the clutch members 40 and 41, and is interrupted or depressed as shown at 52. The depression 52 permits the plungers 45 to successively move inwardly into engagement with the rack 43, only after they are released by the tripping mechanism 7, which is provided with a detent arranged to successively hold the clutch elements 45 in retracted position. The depression 52 is formed on an arc of the track 51 of substantially the same degree as the angle formed by two adjacent arms of the spider 41, thereby permitting the rollers 50 to progressively enter the depression 52 only one at a time, as shown in Figure 4.

In the form shown, the tripping mechanism 7 comprises a vertically shiftable member 53 slidably supported on pins 54 fixed on the central frame structure 8. Mounted on the member 53 adjacent its upper end, is a detent 55 arranged to coact with recesses 56 formed in the plungers 45 for successively holding the plungers retracted. The member 53 is normally urged upwardly to locate the detent 55 in position to coact with the clutch elements 45 by springs 57 embracing the pins 54 and bearing between the frame structure 8 and the lower end of the member 53. Rotatably mounted on the member 53, is a vertically disposed rod 58 having a portion of its shank threaded to receive a vertically adjustable tripper arm 59. The tripper arm extends into position to successively coact with the rollers 24 of the scale plates 21, so as to be actuated for releasing the detent 55 by the movement of the scale plate to a predetermined position relative to its cell, when the latter is located in upright position for filling. The adjustable mounting of the tripper arm 59 permits setting of the tripping mechanism for operation at various positions of the scale plates relative to the cells, thereby controlling the amount of dough received in each charge. In the form shown, adjustment of the tripper arm 59 is effected through the rotation of the rod 58 by means of a handle 60 and intermeshing pinions 61 and 62. To permit the manual retraction of the detent 55, irrespective of the weight of the dough in the cells, the tripping mechanism includes a cam 63, operated by a handle 64, and located in position to coact with the upper end of the rod 58, so that by the rotation of the handle 64, the rod 58 and its supporting member 53 are forced downwardly against the action of the springs 57.

In operation, the clutch members 40 and 41 are normally disengaged and the carrier 2 is stationary with one of its cells located in upright position for filling. In this position of the clutch members, one of the plungers 45 is held retracted by the detent 55 of the tripping mechanism, and the remaining plungers are held retracted by the cam track 51. The batch of dough in the hopper 30 is fed by the rollers 31 through the outlet 13 and into the upright cell 3. The weight of the dough in the cell forces the scale plate downwardly until the roller 24 comes in contact with the tripper arm 59, which is thereby actuated to retract the member 53 and detent 55. The retraction of the detent 55 permits the respective clutch element 45 to move into driving engagement with the annular rack 43, thereby causing the clutch member 41, shaft 11 and carrier 2 to rotate with the clutch member 40 until the roller 50 of the driving plunger 45 rides up the cam track 51 from the depression 52. When the roller 50 of the driving plunger 45 moves out of the depression 52, the following plunger moves into engagement with the detent 55, which has been urged upwardly by the springs 57, and the carrier 2 stops in position to locate the succeeding cell 3 in register with the outlet 13. If it is desired to rotate the carrier 2 during the cleaning of the machine for ejecting fine particles of dough from the cells, the tripping mechanism is manually actuated by means of the handle 64.

Although but one specific embodiment of this invention has been herein shown and described, it will be understood that numerous details of the construction shown may be altered or omitted without departing from the spirit of this invention, as defined by the following claims.

I claim:

1. A dough divider comprising a carrier rotatable on a horizontal axis, a cell supported on said carrier and disposed radially with respect to said axis whereby the rotation of said carrier moves said cell from an upright to an inverted position, a movable bottom in said cell, means for delivering dough to said cell, and mechanism controlled by the position of said movable bottom relative to said cell for intermittently actuating said carrier.

2. A dough divider comprising a carrier rotatable on a horizontal axis, a cell supported on said carrier and disposed radially with respect to said axis whereby the rotation of said carrier moves said cell from an upright to an inverted position, a movable bottom in said cell, means for delivering dough to said cell and mechanism for intermittently rotating said carrier, said mechanism being controlled by the position of said movable bottom relative to the cell when the latter is located in position to be filled by said delivery means.

3. A dough divider comprising a carrier rotatable on a horizontal axis, a cell supported on said carrier and disposed radially with respect to said axis whereby the rotation of said carrier moves said cell from an upright to an inverted position, a movable bottom in said cell, means for delivering dough to said cell, operating mechanism for rotating said carrier, and a clutch shiftable into and out of position for connecting said carrier to said operating mechanism, said clutch being controlled by the position of said movable bottom relative to said cell when the latter is located in position to be filled by said delivery means.

4. A dough divider comprising a carrier rotatable on a horizontal axis, a cell supported on said carrier and disposed radially with respect to said axis whereby the rotation of said carrier moves said cell from an upright to an inverted position, a movable bottom in said cell, means for delivering dough to said cell, operating mechanism for rotating said carrier, a clutch normally urged into operative position for connecting said carrier to said operating mechanism, and tripping mechanism adapted to hold said clutch inactive, said tripping mechanism being arranged to coact with said movable bottom so as to be actuated for releasing said clutch by the movement of said bottom to a predetermined position relative to the cell when the latter is located in position to be filled by said delivery means.

5. A dough divider comprising a carrier rotatable on a horizontal axis, a cell supported on said carrier and disposed radially with respect to said axis whereby the rotation of said carrier moves said cell from an upright to an inverted position, a movable bottom in said cell, means for delivering dough to said cell, operating mechanism for rotating said carrier, and a clutch including a pair of members arranged to coact with each other for connecting said carrier to said operating mechanism, one of said members being connected to said operating mechanism so as to be continuously rotatable, the other of said members being fixed on said carrier, a clutch element mounted on said other member and shiftable into and out of driving engagement with said one member, means normally urging said clutch element into operative position, and tripping mechanism arranged to hold said clutch element retracted, said tripping mechanism being adapted to coact with said movable bottom for releasing said clutch element by the movement of said bottom to a predetermined position relative to said cell when the latter is located in position to be filled by said delivery means.

6. A dough divider comprising a driven shaft, a rotatable carrier fixed on said shaft and having a plurality of cells arranged in its periphery and spaced apart circumferentially, movable bottoms arranged in said cells to form scale plates, filling means for delivering dough to said cells, operating mechanism for rotating said shaft so as to bring said cells successively into position to receive a charge of dough from said delivery means, a clutch including a pair of coacting members adapted to connect said shaft to said operating mechanism, one of said members being loosely mounted on said shaft and geared to said operating mechanism, the other of said members being fixed on said shaft, a plurality of axially shiftable plungers mounted on said other member, said plungers being normally urged into driving engagement with said one member, a detent adapted to successively hold each of said plungers in a retracted position, and a cam arranged to hold the remaining plungers retracted, said detent being adapted to coact successively with each of said scale plates so as to be actuated for releasing the respective plunger by the movement of the respective scale plate to a predetermined position relative to its cell when the latter is located in filling position.

7. A dough divider comprising a frame, a carrier rotatably mounted in said frame, a cell supported on said carrier and having a movable bottom forming a scale plate, means for delivering dough to said cell, operating mechanism for rotating said carrier, a clutch including a pair of concentric members arranged in opposed relation and adapted to coact with each other for connecting said carrier to said operating mechanism, an annular rack on the inner face of one of said members, a plurality of axially shiftable plungers mounted on the other member and normally urged into driving engagement with said rack, a detent arranged to successively hold each of said plungers in a retracted position, said detent being adapted to coact with said scale plate so as to be actuated for releasing the respective plunger by the movement of said scale plate to a predetermined position relative to the cell, and an annular stationary cam track located in position to hold the remaining plungers retracted, said cam track being interrupted at a point adjacent said detent so as to permit the respective plunger to move into engagement with said rack when released by said detent.

8. A dough divider comprising a frame, a carrier supported in said frame and rotatable on a horizontal axis, said carrier having a plurality of cells arranged in its periphery and spaced apart circumferentially, movable bottoms arranged in said cells to form scale plates, filling means supported in said frame above said carrier for delivering dough to said cells, operating mechanism for rotating said carrier so as to bring said cells successively into an upright position to receive a charge of dough from said delivery means, a clutch normally urged into operative position for connecting said carrier to said operating mechanism, a vertically shiftable detent supported on said frame and normally urged into position for holding said clutch retracted, and an arm adjustably mounted on said detent and extending into position to coact successively with each of said scale plates for retracting said detent to release said clutch by the movement of the respective scale plate to a predetermined position relative to its cell.

Signed at Chicago this 24 day of Oct., 1922.

DENNIS WOOD SMITH.